May 14, 1929.  W. P. DALRYMPLE  1,712,692
TEMPERATURE INDICATOR FOR AUTOMOBILE ENGINES
Filed March 10, 1927
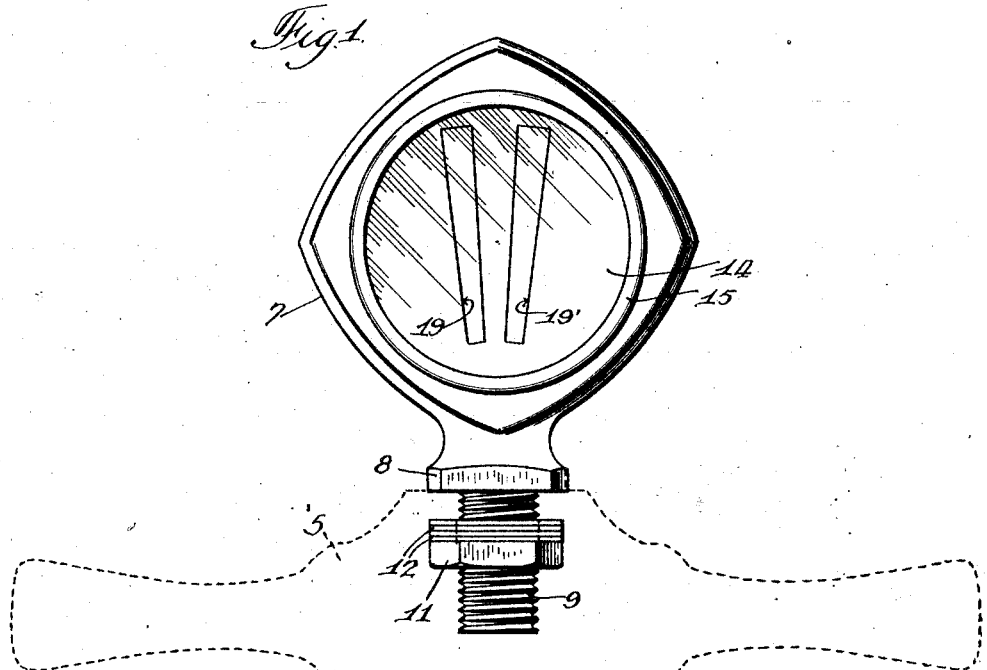
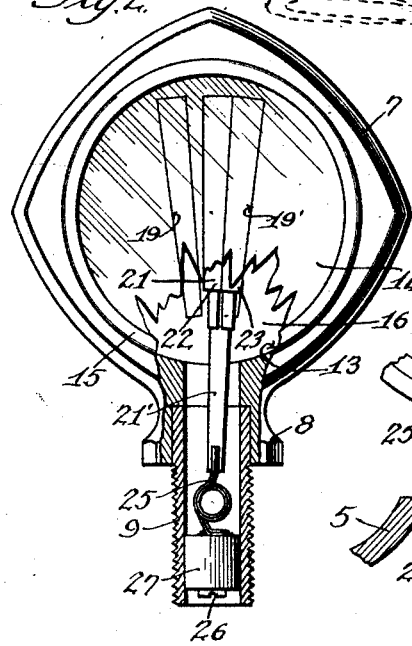
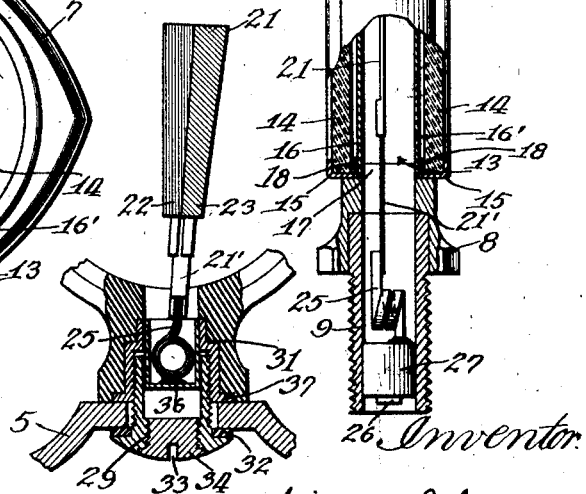
Inventor
William P. Dalrymple
By John L. Jackson
Atty Patented May 14, 1929.

1,712,692

UNITED STATES PATENT OFFICE.

WILLIAM P. DALRYMPLE, OF CHICAGO, ILLINOIS, ASSIGNOR TO GEORGE T. CULLEN, OF RIVER FOREST, ILLINOIS, AND JOSEPH P. GORDON, OF CHICAGO, ILLINOIS.

TEMPERATURE INDICATOR FOR AUTOMOBILE ENGINES.

Application filed March 10, 1927. Serial No. 174,399.

The present invention relates to temperature indicators for automobile engines, and has particular reference to that type of indicating instrument which is mounted on the radiator cap of the automobile for indicating the approximate temperature of the engine through the temperature of the water cooling system. More specifically, the invention pertains to instruments of this type employing a vane or target which is moved to different indicating positions relative to a sight window or windows in the upper part of the instrument.

The general object of the invention is to simplify and improve these devices by dispensing with the pivot mounting heretofore provided for the target, such being attained by mounting the target directly on the thermostatic element for movement therewith; to provide an improved form and arrangement of the sight windows for cooperation with this direct mounting of the target on the thermostatic element; and to otherwise improve upon these devices in a manner which will hereinafter appear. Referring to the accompanying drawing illustrating a preferred embodiment of the invention:

Figure 1 is a front elevational view of the instrument mounted on a radiator cap.

Figure 2 is a similar view of the instrument removed, part thereof being broken away in section.

Figure 3 is a side view of the instrument, partly in section, and

Figure 4 is a sectional view of a modified construction.

To illustrate a typical adaptation I have shown in dotted lines in Figure 1 a conventional radiator cap 5 mounted on the filler inlet 6 of the automobile radiator. This cap may be of the screw threaded type or of the hinged type and may be provided with locking mechanism for preventing its unauthorized removal, such being details with which the present invention is not concerned. The indicator, illustrated in full lines, is shown as being a separate unit adapted for attachment to the cap 5, but obviously, the two might be made integral. When the indicator is constructed as a separate unit, the casing or shell 7 thereof is formed with a base portion 8 which rests on the top of the cap and which may be secured thereto in any suitable manner. In the construction shown in Figures 1 to 3, the casing comprises a sleeve 9 which extends down from the base portion 8 and passes through a hole in the cap 5, such sleeve being threaded for receiving a nut 11 and suitable washers 12 for screwing up against the underside of the cap.

The upper portion of the casing may be of any desired configuration, the interior being hollow to define a chamber 13 within which is disposed the indicating target. The front and rear faces of this chamber are preferably closed by glasses 14 which are held in place by bezels 15 suitably secured in the casing 7. In forming the sight windows in the device I preferably form the same in two metallic disks 16—16', which are positioned on the inner sides of the glasses 14, such disks being spaced apart and having their inner sides bearing against the sides of an annular flange 17 extending inwardly from the casing. Any suitable washers 18 may be interposed between the glasses 14 and the disks 16—16'.

Each disk is formed with a pair of upwardly extending slot-like openings 19—19', which are disposed in close proximity to each other adjacent the center of the instrument, and which pairs of openings aline between the two disks so as to form two sight windows through which light can pass. These openings are preferably tapered slightly and converge toward each other at their lower ends so that they extend substantially radially with respect to the swinging movement of the target vane 21, which is disposed for swinging movement between the two disks 16—16'. As shown in Figure 4, this target consists of a sheet metal vane of a length corresponding to the length of the openings 19—19' and having its vertical edges preferably tapered slightly to conform to the tapered form of the openings. Each side of the target has appropriate color bands or stripes 22 and 23 extending vertically thereof, one of these color areas preferably being red and the other green. These color areas are adapted to register respectively with the two sight windows 19—19', so that the movement of the vane in one direction will present one color area in one window, and movement of the vane in the opposite direction will present the other color area in the other window.

The vane or target is supported directly on the thermostatic element, which in the construction shown, consists of a bi-metallic strip 25 disposed in the tubular base portion of the casing. The target vane has a depending arm portion 21' which extends down into this tubular base and is soldered or otherwise secured to the upper end of the bi-metallic strip. The latter is preferably coiled helically intermediate its ends to give a greater range of movement to the target, and the lower end of the strip is soldered or otherwise secured to a screw 26 extending down through a plug 27 of fibre or like material anchored in the sleeve 9. The lower end of the screw 26 is exposed to the temperatures prevailing within the radiator cap 5, the screw conducting such temperatures up to the bi-metallic strip.

In the operation of the device the temperature of the cooling system will be transmitted up through this screw to the bi-metallic strip, the latter being thereby caused to flex to a degree depending upon the temperature conducted to it. This flexure of the strip will result in swinging movement of the target 21 to present one or the other of its colored areas to a greater or less degree in its respective window. It will be understood that the arrangement is such that when considerable heat is conducted to the bi-metallic strip, corresponding to a dangerous temperature in the cooling system, the latter will be flexed in a direction and to a degree sufficient to move the red area completely across its associated window, thereby giving the desired warning indication. Conversely, when the cooling system is at a lower temperature, the green area of the target will be exposed to a greater or less extent, depending upon the temperature, in the other window. It will be observed that when the target moves across one of the windows it completely obstructs the passage of light therethrough, thus giving an indication which can be clearly discerned at night. The target is constructed of sheet metal, such as aluminum, and its weight is so slight that it can be supported directly on the thermostatic element without affecting the operation of the latter, this light weight also avoiding any tendency of the target to vibrate.

In the modified construction shown in Figure 4, I have illustrated the upper casing portion as being composed of bakelite, vulcanite, or some other heat insulating material so as to minimize the dissipation of heat from the thermostatic element to the atmosphere through such portion of the casing. It will be understood that, if desired, the upper casing portion of the embodiment shown in Figures 1, 2 and 3 can also be constructed of this same heat insulating material. Furthermore, compensating means may be provided in the device for compensating for exterior thermal conditions, such compensating means being disclosed broadly in my copending application, Serial No. 174,398, filed March 10, 1927. In the embodiment shown in Figure 4, the casing is attached to the cap 5 by a screw 29 which passes up through the hole in the top of the cap and threads into a tapped bushing 31 rigidly embedded in the base portion of the casing. A gasket 32 is interposed between the head of the screw and the underside of the cap to prevent leakage. The screw 29 is driven through a kerf 33 formed in an inner screw 34 threading into a tapped hole in the end of the outer screw. Unauthorized removal of the instrument is thus prevented by the fact that the inner screw will release first. The lower end of the bi-metallic strip 25 is soldered to the bottom of a thimble 36 which is pinned or soldered to the upper portion of the bushing 31. The bushing has an outwardly extending flange 37 at its lower end adapted to contact with the upper side of the cap. In this construction, heat will be conducted through the cap and through the flange 37, bushing 31 and thimble 36 to the bi-metallic element.

What I claim as my invention and desire to secure by Letters Patent, is—

1. In a temperature indicator for mounting on an automobile radiator cap, the combination of a casing having two laterally divergent slot-like windows in its upper portion disposed in close proximity to each other, a bi-metallic strip in said casing, and a wedge-shaped target supported directly on said bi-metallic strip for swinging movement thereby and having differently colored areas adapted to be presented in said windows.

2. In a temperature indicator for mounting on an automobile radiator cap, the combination of a casing having a tubular base portion and a plurality of sight windows in the upper portion, a coiled thermostatic element mounted in said tubular portion and having a vertically extending end portion thereon, an indicating vane having different colored areas movable into registry with said windows, said vane being rigidly secured to the vertical portion of said thermostatic element, which constitutes the sole support of and the motive means for said vane.

3. In a temperature indicator for mounting on an automobile radiator cap, the combination of a casing having window means in its upper portion, a coiled thermostatic element having its lower end secured in said casing and having a single, vertically extending upper end adapted for lateral swinging movement under the influence of change of temperature, and an indicating vane having different colored areas movable into variable registry with said window means, said vane being mounted directly on and rigidly secured to the single, vertically extending upper end of said thermostatic element, whereby said vertically extending upper end constitutes the sole support of and the motive means for said vane for swinging the latter substantially horizontally in an arcuate path across said window means.

4. In a temperature indicator for mounting on an automobile radiator cap, the combination of a casing having a sight window thereon, a bi-metallic thermostatic strip having its lower end secured in said casing and having a single, vertically extending upper end adapted for lateral swinging movement under the influence of change of temperature, and an indicating vane adapted to have variable registry with said sight window, said vane being mounted directly on and rigidly secured to the single, vertically extending upper end of said bi-metallic strip, whereby said vertically extending upper end constitutes the sole support of and the motive means for said vane, for swinging the latter substantially horizontally in an arcuate path across said sight window.

WILLIAM P. DALRYMPLE.